Dec. 20, 1949 R. A. McLAUGHLIN 2,491,870
CAR LOADING PLATE
Filed Sept. 16, 1946 2 Sheets-Sheet 1

Inventor
R. A. McLaughlin
By [signature]
Attorney

Dec. 20, 1949  R. A. McLAUGHLIN  2,491,870
CAR LOADING PLATE

Filed Sept. 16, 1946  2 Sheets-Sheet 2

Inventor
R. A. McLaughlin
By
Attorney

Patented Dec. 20, 1949

2,491,870

UNITED STATES PATENT OFFICE 2,491,870

CAR LOADING PLATE

Richard A. McLaughlin, Canton, Ohio, assignor to Poor & Company, Chicago, Ill., a corporation of Delaware Application September 16, 1946, Serial No. 697,359

5 Claims. (Cl. 14—72)

This invention relates to car loading plates for bridging the clearance between a platform or dock and a freight car door.

A primary object of the invention is to provide a device which has a novel arrangement of spaced cooperating elements for anchoring the bridging plate to the doorway of the car for preventing shifting thereof under the impact of the wheels of loading trucks passing into and out of the car, and which also has the desirable capacity of being susceptible of mechanical handling by a lift truck to avoid the usual manual labor incident to placing the plate in position or removing it to storage.

Another object of the invention is to make one of the anchoring elements in the form of pivoted arms located at related corners of the plate, which arms may be easily manually moved to anchoring position, and, on the other hand, manually restored to non-anchoring out of use position by moving the plate far enough into the doorway on the fork of a moving lifting truck and then backing up the truck with the plate to carry it away.

With the above and other objects in view, which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which.

Similar reference characters designate corresponding parts throughout the several figures of the drawing.

As will be observed from the drawings, the invention essentially includes in its organization a metallic plate A of suitable dimensions and of preferably elongated rectangular form to fit into the doorway D of a freight car and span the clearance between the sill of the car and the platform or dock P.

The plate A is provided with the spaced cooperating anchoring elements respectively designated as B and C. The elements B are in the form of angles welded to the underside of the plate A. These elements project below the bottom plane of the plate so that when the latter is resting on the floor or other surface it will not lie completely flat so that by manually tilting or rocking the same on the angles the plate may be readily elevated sufficiently to permit the fork of a lift truck to engage therebeneath and pick it up to facilitate transportation of the plate to the car loading position. Also the elements B constitute abutments for engaging the outer edge of the sill of a box car when the loading plate A is lowered from the position in which it is held by the fork of the lift truck and placed in operative position.

Figure 1:
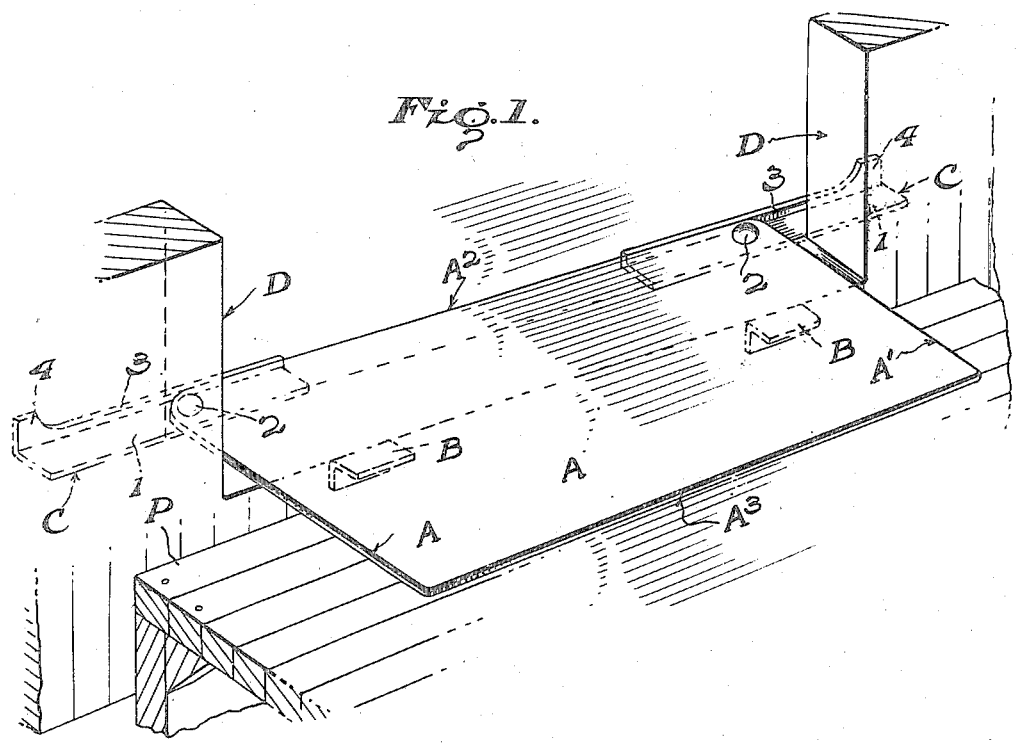
Figure 1 is a perspective view illustrating the application of the invention.
Figure 2:
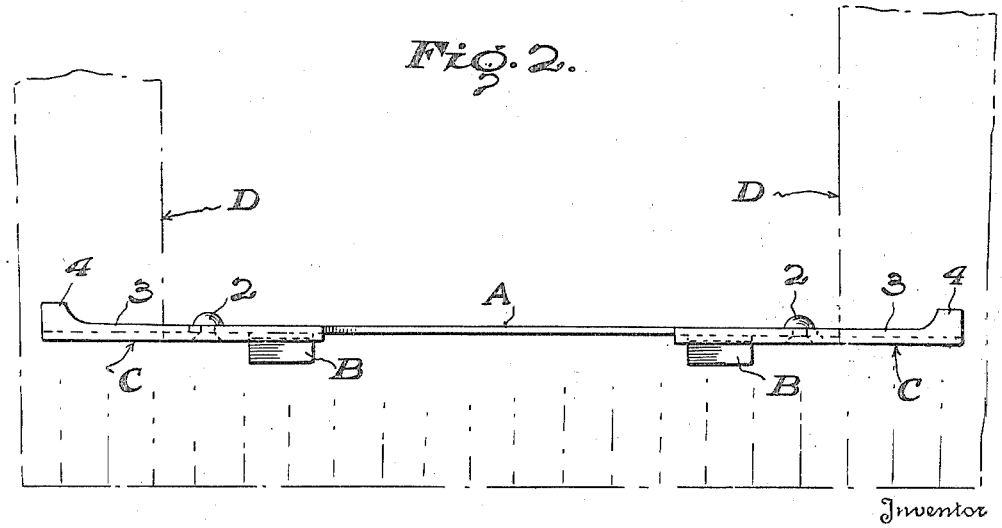
Figure 2 is a front elevation.

The anchoring elements C are preferably in the form of arms 1 which are pivoted to the related corners of the plate A as indicated at 2. The said arms 1 are provided at their outer edges with the upstanding flange or bead portions 3 which serve as a limiting stop for the pivoted arms when they are moved through an arc of 90 degrees respectively to engage the related side edges A1, or the inner edge A2 of the plate. Thus, the arms 1 are of transversely angular cross section so that the long flange underlies the plate A while a portion of the short flange 3 is adapted alternately to engage or abut the side edge A1 of the plate or the inner edge A2. Also, the short flange 3 is of such depth to be flush with the upper surface of the plate when in abutting relation thereto (Figs. 1 and 2) and to facilitate manual engagement of the arm to effect the swinging thereof on the pivots 2 the outer end of each short flange 3 is provided with an upstanding toe portion 4. To facilitate pivoting movement of the arms 1, the corners of the plate adjacent to the pivot are preferably rounded, and it will of course be understood that the pivots secure the arms to the plate with sufficient frictional resistance to prevent free movement thereof.

Figure 3:
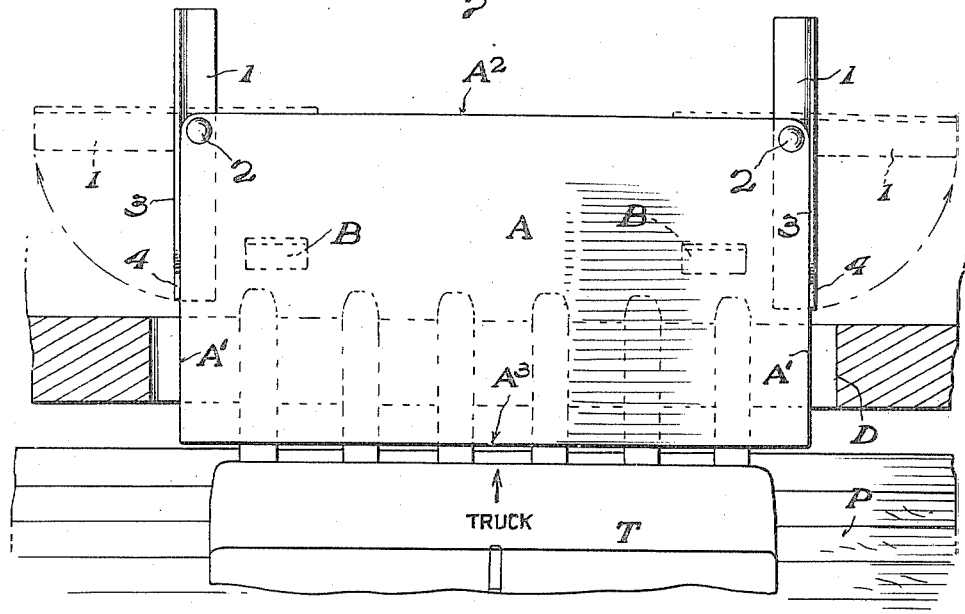
Figure 3 is a diagrammatic view showing how the plate is inserted into the doorway of a boxcar on the forks of a lifting truck.

Normally the arms 1—1 are disposed parallel to the side edges A1 of the plate as shown by full lines in Figure 3. In this position it is possible to insert the plate and the arms into the doorway of the box car. For example, if the plate A is supported by the fork of a lift truck T, the latter is advanced toward the doorway of the car until the plate A projects sufficiently into the car to permit the arms 1—1 to be manually grasped by the handle portions 4 and swung from the full line position of Figure 3 to the dotted line position of the same figure and which is the full line position of Figure 4. The truck is then backed away from the doorway while still supporting the plate A until the arms 1—1 engage the inner side of the doorframe. The truck fork is then lowered and the truck moved away from the plate A and the latter allowed to drop so that the anchoring elements B—B engage the outer edge of the sill of the doorway D. The plate is then ready for use and the arms 1—1 will be locked into position against movement out of the doorway due to the fact that the flanges or beads 3 engage or abut the inner edge A2 of the plate, while, of course, the plate cannot shift into the doorway because the lugs B engage the outer face of the car sill.

Figure 4:
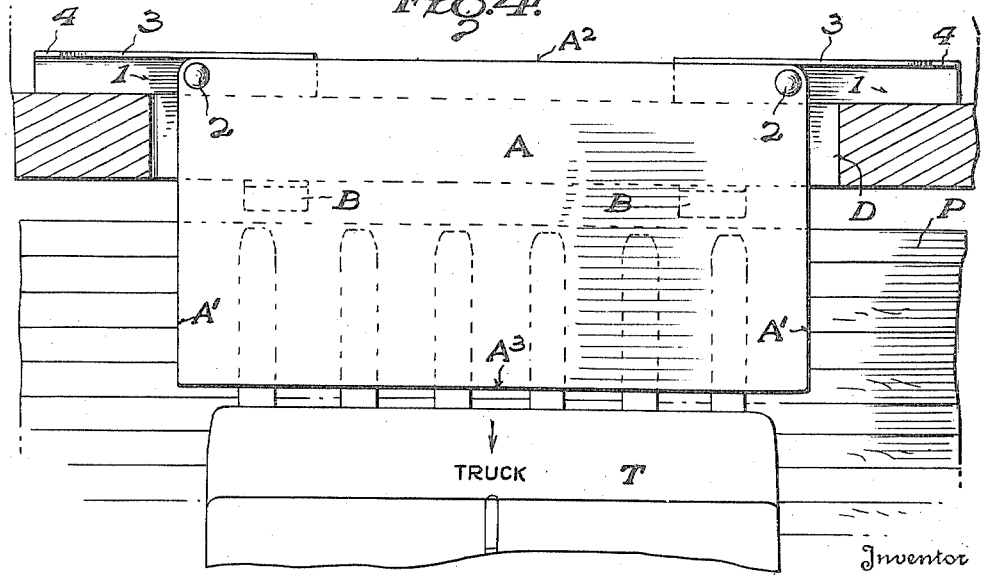
Figure 4 is a view similar to Figure 3 showing the truck backed away and the plate dropped to working position.

When it is desired to remove the plate as shown in Figure 4 from the doorway of the car, the outer edge A3 thereof, that is, the edge which rests on the loading dock, is raised or lifted to permit the fork of the life truck T to get beneath the plate A and lift the same sufficiently to disengage lugs B from the car sill. The truck T then advances toward the inside of the car and pushes the plate inwardly until the arms 1—1 may be manually moved 90 degrees from the full line position shown in Figure 3, that is, back to the position where they are parallel to the side edges A' of the plate. When the arms 1—1 are parallel with the side A' of the plate, the truck may be backed off with the plate on its fork, and the latter may be transported to storage.

From the foregoing it is believed that it will be apparent that the present invention provides a car loading plate which not only performs the desired function of rigidly and non-shiftably spanning the clearance between the freight car and the loading platform or dock, but also is susceptible of mechanical handling to the extent that no manual labor is required except for moving the arms 1—1 from one angular position to another.

Without further description it is thought that the features and advantages of the invention will be readily apparent to those skilled in the art, and will, of course, be understood that changes in the form, proportion and minor details of construction may be resorted to within the scope of the appended claims.

I claim:

1. In a car loading plate, a pair of arms pivoted to opposite corners of the plate to swing in a horizontal plane parallel to the plate from a position substantially in alinement with the side edges of the plate to a position at right angles thereto, said arms each being of angular cross section providing long and short flanges, said long flanges in either position underlying the plate, and portions of said short flanges adapted for engagement with the side edges of the plate when the arms are in substantial alinement with said side edges to permit the insertion of the plate in a doorway, and portions of said short flanges adapted for engagement with the inner edge of the plate when the arms are at right angles to the side edges of the plate to engage the inner side of a doorway.

2. In a car loading plate, a pair of arms pivoted to opposite corners of the plate to swing in a plane parallel to the plane of the plate from a position substantially in alinement with the side edges of the plate to a position at right angles thereto, said arms each being of angular cross section providing a long flange to underlie the plate and a short flange of such depth as to lie flush with the top surface of the plate, said long flange in either position underlying the plate and portions of said short flanges adapted for engagement with the side edges of the plate when the arms are in substantial alinement with said side edges to permit the insertion of the plate in a doorway, and portions of said short flanges adapted for engagement with the inner edge of the plate when the arms are at right angles to the side edges of the plate to engage the inner side of a doorway.

3. In a car loading plate, a pair of arms of transversely angular cross section providing long and short flanges, the said long flanges of the arms having the medial portions thereof pivotally secured to the underside of the plate at opposite corners thereof, whereby, when the arms are parallel to the side edges of the plate a portion of their short flanges at one side of their pivots abuts the side edges of the plate and the arms may be inserted into the doorway of a car, said short flanges having the portions at the other side of their pivots adapted for abutment with the inner edge of the plate when the arms are moved through an angle of 90° to project the same in position to engage the inner side of said doorway.

4. In a car loading plate, a pair of arms pivoted at their medial portions to opposite corners of the inner edge of the plate and having marginal abutment flanges, said arms being normally positioned substantially parallel with the side edges of said plate to enter a doorway, said arms adapted to move in a plane parallel to the plane of the plate from said normal position to a position parallel to the inner edge of the plate to engage the inner side of said doorway, and sill engaging lug means on the under side of the plate inwardly of said arms and parallel to the inner edge of the plate for engaging the outer side of the sill of the doorway when the arms engage the inner side of said doorway.

5. In a car loading plate, a pair of arms pivoted at their medial portions to opposite corners of the inner edge of the plate and having marginal abutment flanges, said arms being normally positioned substantially parallel with the side edges of said plate to enter doorway, said arms adapted to move in a plane parallel to the plane of the plate from said normal position to a position parallel to the inner edge of the plate to engage the inner side of said doorway and sill engaging lug means on the under side of the plate inwardly of said arms and parallel to the inner edge of the plate for engaging the outer side of the sill of the doorway when the arms engage the inner side of said doorway, said lug means also constituting means to tilt the plate when the latter rests on a flat surface.

RICHARD A. McLAUGHLIN.

REFERENCES CITED

The following references are of record in the file of this patent:

UNITED STATES PATENTS

| Number | Name | Date |
| --- | --- | --- |
| 160,329 | Jones | Mar. 2, 1875 |
| 1,131,783 | Howard | Mar. 16, 1915 |
| 1,558,581 | Bloom | Oct. 27, 1925 |
| 1,627,548 | Badura | May 10, 1927 |
| 1,687,354 | Systrom | Oct. 9, 1928 |
| 1,821,734 | Viche | Sept. 1, 1931 |
| 2,083,178 | Woodruff | June 8, 1937 |
| 2,284,022 | Schmeller | May 26, 1942 |
| 2,424,876 | Butler | July 29, 1947 |